Oct. 29, 1946.    G. H. SCHAUWEKER    2,410,184
EYE PROTECTION DEVICE
Filed Aug. 21, 1944

INVENTOR.
GEORGE H. SCHAUWEKER
BY
ATTORNEY

Patented Oct. 29, 1946

2,410,184

UNITED STATES PATENT OFFICE 2,410,184

EYE PROTECTION DEVICE

George H. Schauweker, Southbridge, Mass., assignor to American Optical Company, Southbridge, Mass., a voluntary association of Massachusetts Application August 21, 1944, Serial No. 550,399

5 Claims. (Cl. 2—14)

This invention relates to eye protection devices and has particular reference to novel ventilation means for such devices.

One of the principal objects of the invention is to provide the eyecups of a protection goggle adapted more particularly for use by welders or the like with ventilation means which will afford ample ventilation for the eyecups and simultaneously protect the eyes from the hazardous effects of flying particles, heated sparks or the like during the use of the goggle.

Another object of the invention is to provide goggles of the above character with ventilation means for directing air inwardly of the goggle in an indirect path whereby the lens retaining ring, when in position of use, functions as baffle means overlying the entrance opening of the ventilation means.

Another object is to provide ventilation means of the above character which will prevent injurious light rays from entering the eyes of the wearer.

Other objects and advantages of the invention will become apparent from the following description taken in connection with the accompanying drawing, and it will be apparent that many changes may be made in the details of construction and arrangement of parts without departing from the spirit of the invention as expressed in the accompanying claims. I, therefore, do not wish to be limited to the exact details of construction or arrangement of parts as the preferred forms only have been given by way of illustration.

Referring to the drawing.

Figure 1:
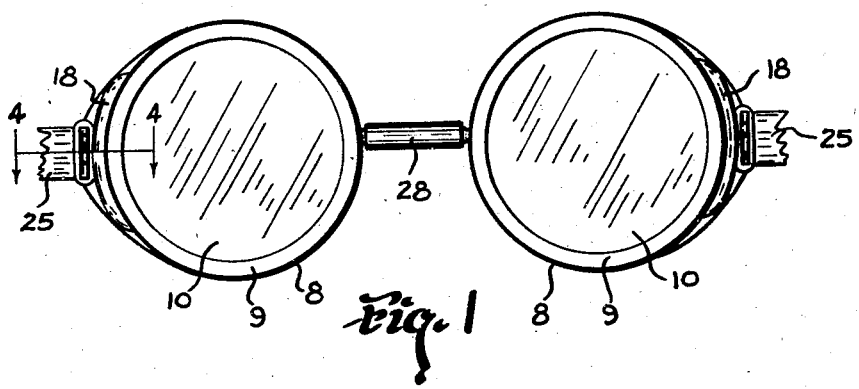
Fig. 1 is a front elevational view of a goggle embodying the invention.
Figure 2:
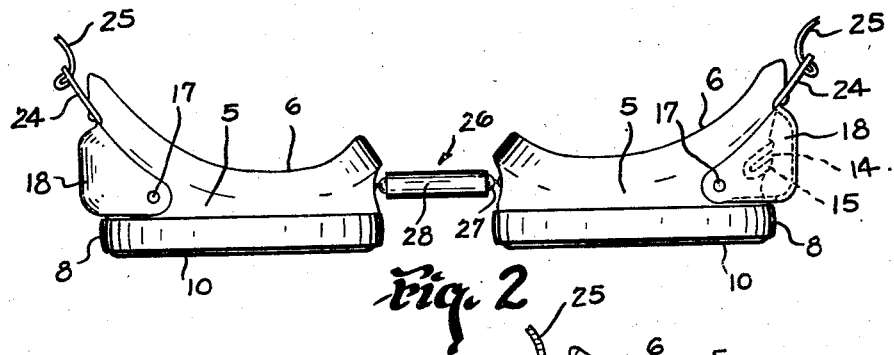
Fig. 2 is a top plan view of the goggle illustrated in Fig. 1.

Referring to the drawing wherein like characters of reference designate like parts throughout the several views, the device embodying the invention comprises a pair of eyecups 5 each having an edge portion 6 shaped to the general contour of the face about the eyes. The said eyecups 5 are provided adjacent the forward edge thereof with a threaded portion 7 to which a suitable lens retaining ring 8 is adapted to be threadedly connected. The lens retaining ring 8 is provided with a flange 9 which is adapted to support lenses 10 on the forward edge 11 of the eyecups. The lenses 10 may be of any suitable type used in goggles of this nature and preferably comprising a rear lens element embodying means for protecting the eyes against injurious rays and having an outer clear glass cover lens thereover. The said lenses 10 are preferably provided with a spacer ring 12 positioned therebetween and adapted to retain said lenses in spaced relation with each other. The said ring 12 may be formed of leather, fibre, rubber or other suitable resilient material of a cushioning nature. The side wall 13 of each of the eyecups is provided with a slot-like opening 14 having an outwardly extending integral surrounding shoulder 15. A baffle plate or shield 16 is secured to the outer side wall of the eyecup by suitable pins, screws or the like 17 and embodies a cupped portion 18 overlying the shouldered slot-like opening 14 with a considerable space therebetween to form an air chamber 19 between the outer wall of the cupped portion 18 and the adjacent side wall 13 of the eyecup. The forward wall 20 of the cupped portion 18 is cut away as indicated at 21 to form a passageway between the front edge 22 of said wall and the adjacent outer surface of the side wall 13 of the eyecup. The rear edge surface of the lens retaining ring overlies the cutaway portion 21, as shown best in Fig. 4, and thereby functions as a baffle for preventing direct entrance of air through said cutaway portion and thereby aids in shunting the entrance of sparks, flying particles or the like inwardly of the chamber 19. Should such sparks, flying particles or the like enter the chamber 19, the shoulder 15 surrounding the slot-like opening 14 will further aid in preventing such sparks, flying particles or the like entering the interior of the eyecup. The direction of flow of the air is diagrammatically illustrated by the various arrows in Fig. 4.

It is to be noted that the rear edge surface 23 of the lens retaining ring 8 is slightly spaced from the forward wall portion 20 of the cupped portion 18.

The cupped portion 18 is provided with an integral slotted ear portion 24 to which a suitable headband or the like 25 is attached.

Figures 3, 4:
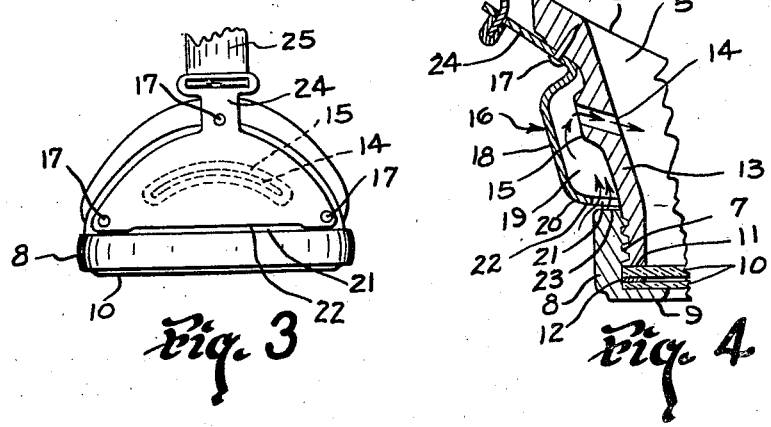
Fig. 3 is a side elevational view of one of the goggle eyecups of Figs. 1 and 2.
Fig. 4 is a fragmentary enlarged sectional view taken as on line 4—4 of Fig. 1 and looking in the direction indicated by the arrows.

The slot-like opening 14 is preferably in the form of a crescent shape, such as shown in Fig. 3, whereby an opening of greater length may be formed in the side wall of the goggle than would be possible if a straight-line slot were formed. It is also to be noted that the slot is curved or cupped in a rearward direction or in a direction rearwardly of the lenses.

The eyecups 5 are joined with each other by a suitable bridge member 26 which, in this instance, comprises a flexible ball chain-like member 27 covered with a tubing 28 of heat resisting material.

From the foregoing description it will be seen that simple, efficient and economical means have been provided to accomplish all of the objects and advantages of the invention.

Having described my invention, I claim:

1. A device of the character described comprising a goggle eyecup having an opening in its side wall and connecting means adjacent the forward edge thereof, said wall, surrounding the opening, having an outwardly raised portion, a lens retaining ring having means for connection with said connecting means and a baffle plate carried by the eyecup overlying the opening in the side wall and spaced from said raised portion and having an entrance opening adjacent the forward edge thereof and located in the rear of the lens retaining ring when said ring is in position of use, the major portion of said entrance opening lying inwardly of the plane of the outer end surface of the raised portion.

2. A device of the character described comprising a goggle eyecup having an opening in its side wall and connecting means adjacent the forward edge thereof, said wall, surrounding the opening, having an outwardly protruding shoulder, a lens retaining ring having means for connection with said connecting means and a cup-like baffle plate carried by the eyecup overlying the opening in the side wall and having its contour edges throughout the side and rear thereof shaped substantially to the shape of and to fit relatively intimately with the wall of the eyecup surrounding the opening and having its forward edge, in the rear of the lens retaining ring, when said ring is in position of use, spaced from said ring and the adjacent wall of the eyecup to provide an entrance opening, the major portion of said entrance opening lying inwardly of the plane of the outer end surface of the protruding shoulder.

3. A device of the character described comprising a goggle eyecup having a slot-like opening in its side wall and connecting means adjacent the forward edge thereof, a lens retaining ring having means for connection with said connecting means and a baffle plate carried by said eyecup overlying the slot-like opening in the side wall and spaced from said side wall throughout the central area of said baffle plate and having its forward edge spaced from the side wall of the eyecup adjacent the rear edge of the lens retaining ring, when said ring is in position of use, for providing an entrance opening, said slot-like opening having an outwardly protruding shoulder surrounding the outer edge thereof and spaced from the central area of the baffle with the major portion of the entrance opening lying inwardly of the plane of the outer end surface of the shoulder.

4. A device of the character described comprising a goggle eyecup having an opening in its side wall with a shoulder surrounding the outer edge of said opening and a cupped baffle plate carried by the side wall of the eyecup and overlying the opening in said side wall, the cupped portion being spaced from the outer end surface of said shoulder and having its forward edge spaced from the adjacent wall of the eyecup to provide an entrance opening adjacent the forward portion of the baffle plate, the major portion of said entrance opening lying inwardly of the plane of said outer end surface of the shoulder.

5. A device of the character described comprising a goggle eyecup having an opening in its side wall with a shoulder surrounding the outer edge of said opening and a cupped baffle plate carried by the side wall of the eyecup and overlying the opening in said side wall, the cupped portion being spaced from the outer end surface of said shoulder and having its forward edge spaced from the adjacent wall of the eyecup to provide an entrance opening adjacent the forward portion of the baffle plate, the major portion of said entrance opening lying inwardly of the plane of said outer end surface of the shoulder and said baffle plate having an integral headband attachment portion thereon.

GEORGE H. SCHAUWEKER.